United States Patent [19]
Burke et al.

[11] Patent Number: 5,790,607
[45] Date of Patent: Aug. 4, 1998

[54] APPARATUS AND METHOD FOR RECOVERY OF SYMBOL TIMING FOR ASYNCHRONOUS DATA TRANSMISSION

[75] Inventors: Timothy M. Burke, Algonquin, Ill.; Wayne Sanderson, Fayetteville, Tenn.

[73] Assignee: Motorola Inc., Schaumburg, Ill.

[21] Appl. No.: 563,833

[22] Filed: Nov. 28, 1995

[51] Int. Cl.$^6$ .................................................. H04L 7/00
[52] U.S. Cl. ................................. 375/355; 370/503
[58] Field of Search ........................ 375/355, 354, 375/360, 370, 324, 330; 370/509, 503, 516

[56] References Cited

U.S. PATENT DOCUMENTS

| | | | |
|---|---|---|---|
| 5,001,727 | 3/1991 | McDavid | 375/326 |
| 5,164,965 | 11/1992 | Karaali | 375/355 |
| 5,572,558 | 11/1996 | Behems | 375/355 |

*Primary Examiner*—Stephen Chin
*Assistant Examiner*—Betsy L. Deppe
*Attorney, Agent, or Firm*—Nancy R. Gamburd

[57] ABSTRACT

An apparatus and method for recovery of symbol timing for asynchronous data transmission utilizes an RF downconverter (11), an A/D converter (12), and a digital signal processor (14). The digital signal processor (14) includes an error detection block (130), a timing correction block (135), a counter (140), a programmable capture register (145), a clock (150) to produce clock signals, and preferably a differential detector (155). The error detection block (130) provides information, an error parameter, concerning phase and frequency variances between the clock signal and a transmitted signal. The timing correction block (135) utilizes the error parameter to determine an updated, programmable value stored in the programmable capture register (145). When the counter (140) reaches an instantaneous value equal to the programmable value in the programmable capture register (145), an interrupt signal is generated which adjusts the timing of the clock signal and the clocking of digital samples of the transmitted signal.

32 Claims, 3 Drawing Sheets

APPARATUS AND METHOD FOR RECOVERY OF SYMBOL TIMING FOR ASYNCHRONOUS DATA TRANSMISSION

FIELD OF THE INVENTION

This invention relates, in general, to data communications and data communications systems and devices and, more specifically, to an apparatus and method for synchronization with or recovery of symbol timing for asynchronous data transmission.

BACKGROUND OF THE INVENTION

With the advent of multimedia communications, data transmission has become increasingly complex. For example, multimedia communications applications such as real time transmission of digitally encoded video may require new forms and systems for data communication and data transmission. One such new data communication system is the CableComm™ System currently being developed by Motorola, Inc. In the CableComm™ System, a hybrid optical fiber and coaxial cable is utilized to provide substantial bandwidth over existing cable lines to individual, subscriber access units, for example, households having preexisting cable television capability. These coaxial cables are further connected to fiber optical cables to a central location having centralized or "head end" controllers having receiving and transmitting capability. Such head end equipment may be connected to any variety of networks or other information sources, from the Internet to a video/movie subscriber service. With the CableComm™ System, digital data may be transmitted both in the downstream direction, from the head end (connected to a network) to the individual user (subscriber access unit), and in the upstream direction, from the individual user to the head end (and to the network).

In the CableComm™ System, downstream data is currently intended to be transmitted using 64 QAM modulation at a rate of 30M bps, over channels having 6 MHz bandwidth in the frequency spectrum of 50–750 MHz. Anticipating asymmetrical requirements with large amounts of data tending to be transmitted in the downstream direction rather than the upstream direction, less capacity is provided for upstream data transmission, using the frequency band from 5–40 MHz with a symbol rate of 384 k symbols/sec. In addition, due to the multipoint configuration, i.e., many end users (subscriber access units) transmitting upsteam to a central location, the upstream direction may have considerably more noise than the downstream direction, and may require a different modulation scheme at lower data rates. In addition, it is also highly likely that user transmission may be asynchronous, with various users transmitting data at indeterminate intervals over selected channels in response to polling or other protocols from the head end, rather than transmitting a more continuous stream of information.

For such asynchronous data transmission, it is highly desireable to organize data into recognizable formats or packets for reliable detection by the receiver, with timing information comprising a relatively or comparatively small amount of the overall packet size, such that the timing information does not create excessive overhead for data transmission and correspondingly decrease data throughput. Secondly, it is highly desireable to provide a method and apparatus for quick and reliable recovery of timing or synchronization information for accurate data transmission. Various prior art methods for such timing recovery are often very complex, requiring complicated and expensive digital signal processors having considerable processor size, complexity, and high processor speed, especially for high data rates. In addition, other prior art methods for timing recovery, such as a digital phase locked loop, typically require a significant portion of the data packet to contain timing information in lieu of data, creating significant overhead and correspondingly decreasing the amount of data which may be transmitted and decreasing the data throughput. Accordingly, a need has remained to provide both for an appropriate data packet format, which provides appropriate timing and synchronizing information needed for accurate data reception without excessive overhead (for increased data throughput), and for an apparatus and method to quickly, reliably and accurately detect such timing and synchronizing information prior to the reception of any actual data, without excessive processor complexity.

DETAILED DESCRIPTION OF THE INVENTION

As mentioned above, for asynchronous data transmission and reception, it is highly desireable to organize the data into predetermined formats or packets for accurate and reliable data reception. In addition to providing the actual data, which is highly variable and essentially random, the data packet should also provide appropriate timing and synchronizing information needed for accurate data reception, without creating excessive overhead and without decreasing data throughput. In addition, for asynchronous data tranmission and reception, an apparatus and method is also necessary to quickly, reliably and accurately detect such timing and synchronizing information prior to the reception of any actual data, without excessive or unnecessary processor complexity, speed, and cost.

In a hybrid fiber coax (HFC) network where data transmissions may be generated at subscriber access units and delivered to a centralized head end controller, a reliable method of RF modulation and demodulation is required to provide error-free operation in the presence of high levels of noise. One such method of modulation, employed in the preferred embodiment of the present invention, is $\pi/4$-shift Differential Quadrature Phase Shift Keying ($\pi/4$-DQPSK). The present invention provides a method and apparatus for extracting symbol timing information from a $\pi/4$-DQPSK modulated signal and using that information for the purpose of detection of the binary encoded source data. The method and apparatus embodiments extract such timing information reliably and accurately, with a minimum amount of timing information overhead in the data packet, providing for increased data throughput without substantial processor complexity. Furthermore, a novel method of deriving such timing information in accordance with the present invention is combined with a bandwidth control mechanism to allow for fast determination of the timing information, with a minimum amount of overhead signals, and with minimal processor complexity.

Figure 1:
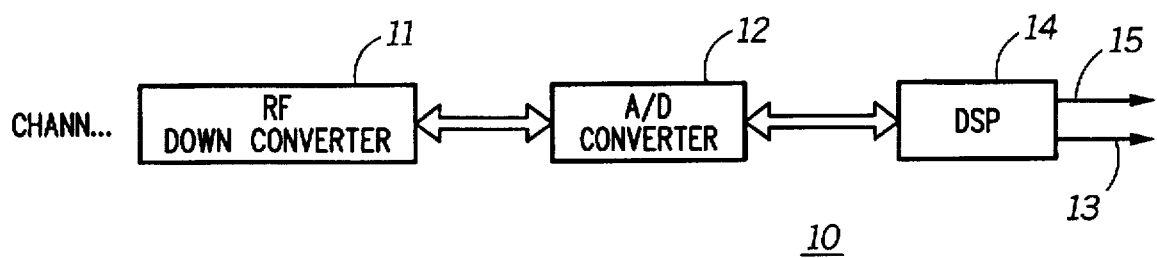
FIG. 1 is a block diagram illustrating an upstream receiver apparatus embodiment in accordance with the present invention.

FIG. 1 is a block diagram illustrating an upstream receiver 10 in accordance with the present invention. The upstream receiver 10 consists of an RF downconverter 11 and baseband signal processing hardware and software, namely, an analog digital converter (A/D converter) 12, and a digital signal processor 14. The RF downconverter 11 receives π/4-DQPSK modulated transmissions from subscriber units in the frequency range of 5–42 MHz and converts the RF signal to baseband, including providing selectivity and gain in the process, producing in-phase "I" and quadrature "Q" signal components (also referred to collectively as quadrature components or signals) in accordance with the π/4-DQPSK modulation scheme. The quadrature I and Q signals output from the RF downconverter 11 are then converted to digital signals by the A/D converter 12. In the preferred embodiment, two 8-bit A/D converters comprise the A/D converter 12. The resulting digital information stream (preferrably 16 parallel bits) from the A/D converter 12 is processed by the digital signal processor (DSP) 14, which extracts symbol timing information and demodulates the π/4-DQPSK data, providing a serial bit stream at its first output 15 and also providing clocking information at a second output 13, as described in greater detail below with reference to FIG. 4. In the preferred embodiment, the DSP 14 is a Motorola DSP56166 or DSP 56002, each of which contain a free-running timer (also referred to as a counter or as a down counter) with an output compare register (OCR) (also referred to as a capture register or a programmable capture register). The A/D converter 12 and the RF downconverter 11 are well known in the art and may be of any type preferred by the user and, accordingly, are not described in detail herein.

Figure 2:
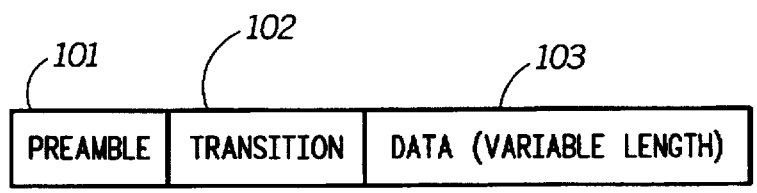
FIG. 2 is a diagram illustrating a data packet format in accordance with the present invention.
Figure 5:
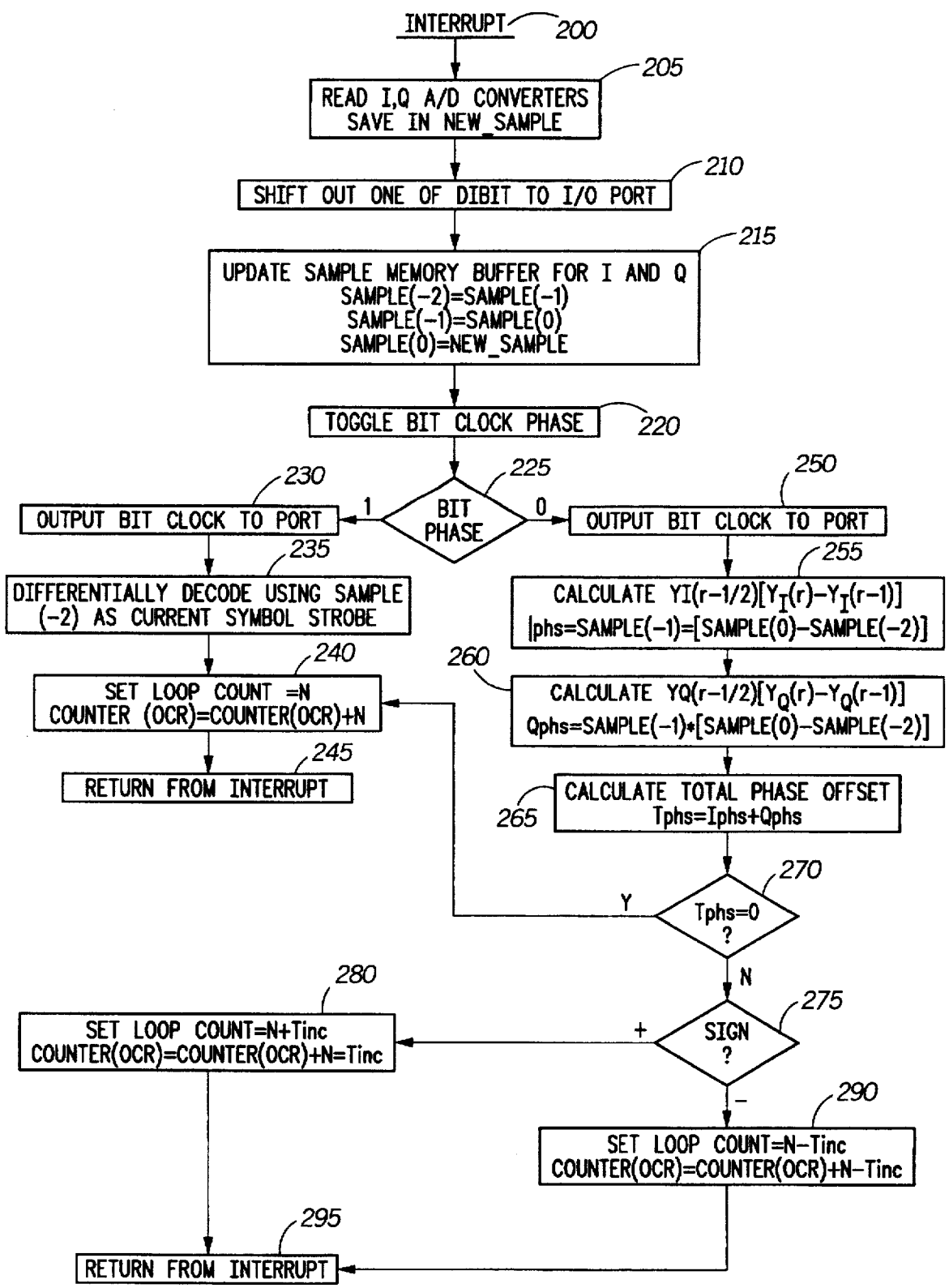
FIG. 5 is a flow diagram illustrating a first method embodiment in accordance with the present invention.

FIG. 2 is a diagram illustrating a data packet format 100 for a transmitted signal in accordance with the present invention. In the preferred embodiment of the invention, data for transmission is organized into packets beginning with a "preamble" 101 comprising a known, predetermined bit sequence, followed by a transition 102 comprising an indicator that data will follow, such as synchronizing information (a SYNC word preferrably having a high autocorrelation), followed by a data stream 103 having a variable length, and possibly also followed by error detection or correction information. As discussed in greater detail below, the preamble 101 is a predetermined stream of bits which provides symbol timing synchronization for the A/D converter sampling of the I and Q signals. The transition or synchronizing information portion (a SYNC word) 102 provides framing of the packet data, such that the data packet is known or assumed to be immediately following the transition 102 or other SYNC word. The DSP 14 processes the data in real time, and the DSP 14 (programmed in accordance with the present invention as illustrated in FIG. 5) controls the sampling of the A/D converter 12 through a symbol timing loop described in greater detail below.

Figure 3:
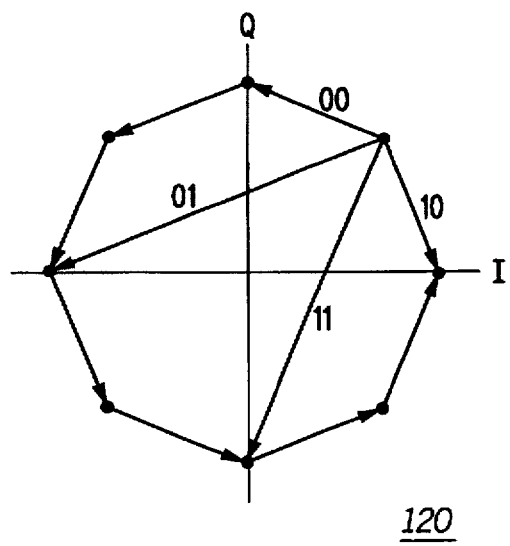
FIG. 3 is a diagram illustrating a $\pi/4$-DQPSK modulation constellation.

FIG. 3 is a diagram illustrating a π/4-DQPSK modulation constellation 120. In an alternative, second method embodiment also utilizing π/4-DQPSK modulation, a preamble may be selected to provide for maximum zero crossing for accurate recovery of timing information. In the second embodiment, the analog I and Q channels from the RF downconverter 11 are hard-limited and combined through a logical exclusive-or gate to providing zero-crossing information. As illustrated in FIG. 3, only the ±π/4 phase changes result in the correct symbol timing, since the ±3π/4 phase changes do not cross through the (0,0) point as would other QPSK data. It should also be noted that two ±π/4 phase shifts are needed to get an I or Q axis crossing (a total of phase shift of 0 or π/2 radians) to result in a zero-crossing pulse or other zero-crossing indicator. Thus, in the second embodiment, the error detection portion of the symbol timing loop is designed to lock onto the first subharmonic of the symbol rate (384 kHz) resulting in a feedback clock of 192 kHz. Note also from the constellation illustrated in FIG. 3 that an optimal preamble sequence of the alternative embodiment may be successive π/4 phase shifts (binary dibit of "00") which "walks around" the unit circle, providing phase transitions at a 192 kHz rate. In the first method embodiment illustrated in FIG. 4, the preamble may be empirically determined.

Figure 4:
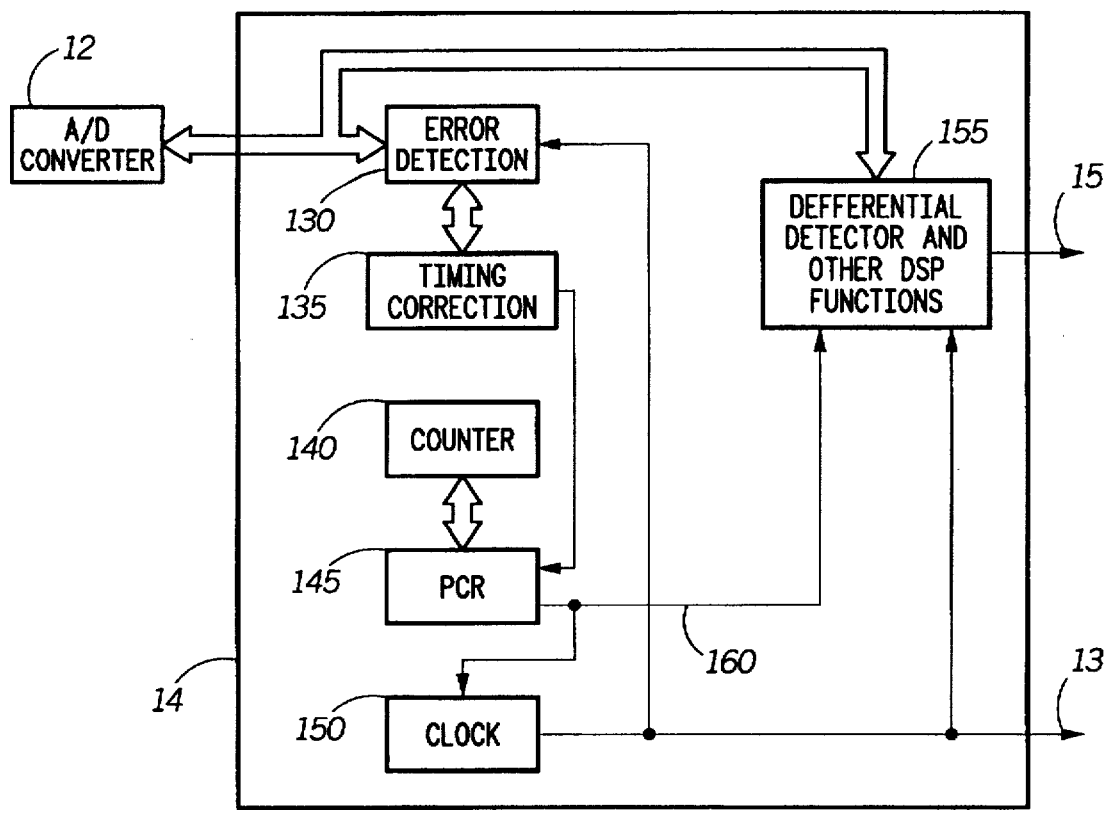
FIG. 4 is a block diagram illustrating the functional blocks of a digital signal processor programmed in accordance with the present invention.

FIG. 4 is a block diagram illustrating the functional blocks of a DSP 14 programmed in accordance with the present invention. The symbol timing recovery function of, or as programmed in, the DSP 14, extracts the inherent timing information embedded within the signal and provides symbol strobes (or sample decisions), for clocking in sample values from the A/D converter 12, for the π/4-DQPSK differential detector 155. The symbol timing loop mentioned above, as programmed in the DSP 14 through a set of program instructions, consists of an error detection functional block 130, a timing correction functional block 135, a counter 140, a programmable capture register (PCR) 145, a clock 150 which generates a clock signal utilized in many DSP 14 and A/D converter 12 functions, and other DSP functions in block 155, such as differential phase detection. The error detector functional block 130 provides an indicator of the amount of timing offset (timing variance), an error parameter, between a locally derived clock signal from clock 150 and the inherent clock embedded within the signal (i.e., the timing information of the transmitted signal). This error parameter or error indicator is then used to in timing correction block 135 to adjust the clock signal (from clock 150) to synchronize to the timing information of the transmitted signal, for proper decoding and data recovery. As discussed in greater detail below, the error parameter may be determined using a first method illustrated in FIG. 5, a second method utilizing a zero crossing detector, or any other similar method of error detection or comparison.

Continuing to refer to FIG. 4, the counter 140 is a continuously running (or free-running) counter, which may count up or down, and which automatically returns to its starting number without intervention through, for example, an interrupt signal. For example, in the preferred embodiment, the counter counts down continuously from over 65,000 (e.g., 65,384) to zero, automatically returns to a value of over 65,000 and resumes down counting and repeating this counting process. The number or value present in the counter 140 at any given time, accordingly, is referred to as an "instantaneous value". The programmable capture register 145 contains a number or value, which may be programmed and updated essentially instantaneously and "on the fly" (no interrupt signals required) and which, accordingly, is referred to as a "programmable value". When the instantaneous value in the counter 140 equals or matches the programmable value, the programmable capture register 145 issues or generates an interrupt signal (on line 160), which is utilized in a variety of functions of the DSP 14. For the purposes of frequency and phase synchronization to the transmitted signal, the interrupt signal is utilized to synchronize the clock 150 (and corresponding clock signals), for example, delaying or advancing the clock signals, in order to clock in the digital samples of the received signal from the A/D converter 12 for use, for example, in data decoding. An interrupt signal generated at the optimal time will clock in digital samples appropriately synchronized with the transmitted signal and, therefore, provide for accurate data recovery from the transmitted signal. As discussed in greater detail below, if an interrupt signal is desired every "N" counts (values or integer values) of the counter 140 as time increments, then the programmable capture register 145 should be programmed with the current instantaneous value (of the counter 140) minus N, such that when the counter 140 subsequently counts down to that number N counts later, an interrupt signal will be generated. If the interrupt signal is to be delayed, then the programmable capture register 145 should be programmed with the instantaneous value minus a number larger than N, i.e., (instantaneous value) minus (N plus an error correction parameter (Tinc discussed below)). If the interrupt signal is to be advanced in time, then the programmable capture register 145 should be programmed with the instantaneous value minus a number smaller than N, i.e., (instantaneous value) minus (N minus an error correction parameter).

As mentioned above, in the error detection block 130, a locally derived clock signal (from the clock 150) is compared with the timing information within the transmitted signal (which, in the preferred embodiment, is contained in the preamble 101). In the preferred embodiment utilizing π/4-DQPSK modulation, the timing information is contained in the phase transitions of the transmitted signal. If the derived clock signal is leading the transmitted signal in phase, extra values (integer numbers) as an error correction parameter or factor should be added to N for programming into the programmable capture register 145, in order to delay the interrupt signal and synchronize the clock signal to the transmitted signal. If the derived clock signal is lagging the transmitted signal in phase, extra values (integer numbers) as an error correction parameter or factor should be subtracted from N for programming into the programmable capture register 145, in order to advance the interrupt signal and synchronize the clock signal to the transmitted signal. When timing synchronized (locked), no extra values are "added" or "subtracted" to the steady-state number N which, when utilized in the capture register, will yield the desired symbol clock rate or frequency. The clock signal is output on line 13.

Significant advantages of this methodology employing the programmable capture register 145 are apparant, and are discussed in greater detail below. First, the timing synchronization may be achieved independently of the interrupt signal, such that no interrupt latency occurs. Second, the method provides for a variable bandwidth for sampling by the A/D converter 12, initially employing a wide bandwidth for fast aquisition of timing synchronization, and a narrow bandwidth for steady-state, accurate data detection with significant noise immunity. The bandwidth is controlled through the variable limits on the error parameter, i.e., the amount of timing correction (or step size, such as Tinc below) allowed during any given iteration of the symbol timing loop programmed in the DSP 14. A larger error parameter (added or subtracted to N) will result in a larger "jump" or correction in the clock signal, resulting in faster synchronization. Conversely, a smaller error parameter will result in smaller corrections, resulting in greater noise immunity during data aquisition and decoding.

The methodology utilized in the error detection block 130 may be any method which compares the phase and frequency of the transmitted signal to the phase and frequency of the clock signal. In the first method embodiment of the present invention, as programmed in the DSP 14, an error detection program was derived from a technique proposed by Gardner, and operates upon the A/D samples from the A/D converter 12, and generates one error parameter for each symbol of the transmitted signal, according to the following equation:

$$E_n = Y_I(r-\tfrac{1}{2})[Y_I(r)-Y_I(r-1)] + Y_Q(r-\tfrac{1}{2})[Y_Q(r)-Y_Q(r-1)]$$

in which $E_n$ is the error parameter, $Y_I(r)$ is a current sample value from the analog-digital converter for an in-phase component, $Y_Q(r)$ is a current sample value from the analog-digital converter for a quadrature component, $Y_I(r-\tfrac{1}{2})$ is a previous sample value one sample interval (half symbol) earlier from the analog-digital converter for the in-phase component, $Y_Q(r-\tfrac{1}{2})$ is a previous sample value one sample interval (half symbol) earlier from the analog-digital converter for the quadrature component, $Y_I(r-1)$ is a previous sample value two sample intervals (full symbol) earlier from the analog-digital converter for the in-phase component, and $Y_Q(r-1)$ is a previous sample value two sample intervals (full symbol) earlier from the analog-digital converter for the quadrature component. See also, Floyd M. Gardner, "A BPSK/QPSK Timing-Error Detector for Sampled Receivers", IEEE Transactions on Communications, Vol. COM-34, NO. 5, May 1986, pp 423-429.

Each error parameter $E_n$ is computed independently and the arithmetic sign of the result is used to make a correction (the number to be added to or subtracted from N) to the symbol timing loop in the timing correction block 135. Thus, if the error result is positive, a positive correction is made. If negative, a negative correction is made. A positive correction results in a retardation through the loop and a negative correction results in an advancement through the loop. The timing error detection block 130 utilizes information from three different sample points. The detector samples the data stream midway between strobe locations in each of the I and Q channels. If there is a transition between symbols, the average midway value should be close to zero, in the absence of timing error. A timing error gives a non zero error parameter sample whose magnitude depends on the amount of error, but either slope is equally likely at a midway point, such that little direction (plus or minus0 information is available in the sample alone. To sort out these different possibilities, the error detection block 130 examines the two digital sample (strobe) values to either side of the midway samples, i.e., the current sample and the sample preceding the midway sample. If there is no transition, the strobe values are the same or within a small variance (delta), resulting in rejecting the midway sample, as no timing information is available in the absence of a phase transition for the π/4-DQPSK modulation scheme. If a transition is present, the strobe values will be largely different and the difference between them will provide slope information. The product of the slope information and the midway sample provides timing error information, the error parameter, utilized in the timing correction block 135.

In a second method embodiment programmed into the DSP 14, the error detection block 130 utilizes a hard limiter, which generates a hard limited signal from the received signal and which, for example, may be represented by the sign (most significant bit) in a 2s complement representation. Zero-crossing phase transitions, which contain timing information, are detected, resulting in a zero-crossing pulse. The zero crossing pulse is then compared with the rising edge of the clock signal, with a corresponding error parameter also generated as a number or count, i.e., a number to be added or subtracted to N to adjust the value in the programmable capture register 145 and correspondingly adjust the interrupt signal timing and the synchronization of the clock signal with the transmitted signal.

Continuing to refer to FIG. 4, as mentioned above, in the preferred embodiment, the DSP 14 is a Motorola DSP56002 digital signal processor, which contains a free-running timer (counter 140) with an output compare register (OCR), also referred to as the programmable capture register (PCR) 145. This PCR can be programmed on-the-fly with a new value which, when equal to the free-running timer value, will cause an interrupt signal. This mode of operation allows precise timing loops without the effects of interrupt latencies. If the DSP 14 oscillator is chosen to be an integer multiple of the bit rate, then the PCR can be programmed with an integer value which will result in processor interrupts at exactly twice the symbol rate. (The free-running timer is actually prescaled by a factor of 2 within the Motorola DSP, such that the available frequency reference to the loop is the DSP oscillator frequency divided by 2). The steady-state number N is calculated using the following expression:

$$N = Fo/2R$$

in which Fo is the oscillator (timer based) frequency in Hertz, and R is the symbol rate of the transmitted signal, in symbols/second. Alternatively, rather than generating two interrupts per symbol interval, a technique may be used to sample the A/D converters half-way through the interrupt service routine (providing the mid-symbol strobe), with interrupts generated at only one times the symbol rate. In this case, the steady state divide number is N=Fo/R. This reduction in the number of actual interrupts is possible since a loop timing correction is only made once for each symbol period. The symmetrical bandwidth of the loop is determined by:

$$B = R*Tinc/N$$

where Tinc is the integer time increment that is adjusted to the steady-state number N within the loop.

FIG. 5 is a flow diagram illustrating a first method embodiment for symbol timing recovery in accordance with the present invention, which may be programmed into the DSP 14. In the preferred embodiment, the method is programmed as an interrupt service routine of the DSP, step 200, to allow the detection process to take place in the "background" of the operation of the DSP.

When an interrupt is received in step 200, the I and Q A/D converters are read and saved in memory as NEW_sample, step 205. Next, in step 210, a single bit of the previously decoded dibit (the dibit being the decoded value from the phase transition) is shifted out of the dibit buffer to an I/O port of the DSP. Next, in step 215, a circular memory buffer is updated containing the samples from the previous interrupt and the half-way (or midway) sampling mentioned above (or, alternatively, from the previous two interrupts). This memory buffer contains the digital sample values of the current symbol, previous symbol, and half-way symbol required by the error detector utilizing the equation described above.

Next, in step 220, a memory location containing the current phase of the bit clock is updated by simply toggling its value from 1 to 0 or 0 to 1 depending on its current state. This operation provides a bit clock that may be used to clock out the decoded data bits from the DSP. Depending on the result of the toggle operation, the flow will take one of two paths. If the bit clock phase is one, that value will be output to the clock output I/O port of the DSP 14, step 230. Then, the differential detector (described below) is run where the sample value stored in Sample(−2) is used as the current symbol sample, step 235. Normally, the sample stored in location Sample(−1) would be used for this operation which represents the mid-symbol strobe sample of the algorithm. However, the processing load is split between two tasks, error calculation and differential detection. The path used for differential detection is one sample delayed from the error calculation and the memory buffer has shifted since that operation occurred. After differential detection where the resulting dibit is stored into the dibit memory, the loop count is set for the normal unadjusted count N, step 240. This is accomplished by reading the current value of the programmable capture register, adding (for an up counter) or subtracting (for a down counter) the value N, and then storing the result back into the programmable capture register. With this technique, no interrupt overhead latencies will occur for the next interrupt. Finally, the interrupt service routine is exited, step 245.

If in step 225 the resulting bit clock phase is zero (toggled between zero and one in step 220), then that value is output to the clock I/O port in step 250. Next the timing error is calculated for both the I (Iphs in step 255) and Q (Qphs in step 260) channels and then summed to yield the final error result (Tphs in step 265). If the error parameter is zero, step 270, then no correction is made by returning to step 240, in which the symbol timing loop count is set to N. If the error parameter is non-zero in step 270, then the sign of the error result is then tested and a correction to the loop timing is made depending on the result, step 275. If the sign of the error result is positive, the loop count is set to N+Tinc, where Tinc is the desired timing increment mentioned above, step 280. If the sign of the error result is negative, the loop count is set to N−Tinc, step 290. As mentioned above, the programmable capture register of the timer is updated, rather than the timer counter itself, to yield an interrupt latency-free timing adjustment. Lastly, the interrupt service routine is exited, step 295.

Note that the timing adjustment, Tinc, is an integer number representing an integer number of processor clock cycles. An adjustment of Tinc will retard or advance the sample positions relative to the symbol timing. In the steady state, the optimum sample position will dither or oscillate back and forth by an amount of +/−Tinc. This parameter controls the bandwidth of the loop as discussed above. An increase in Tinc will result in a wider loop bandwidth and faster acquisition. Similarly, a lower Tinc results in a narrow loop bandwidth and slower acquisition, but greater noise immunity. Evident from the above discussion, acquisition time is a function of the loop bandwidth, because the digital loop above will respond to phase variations and make incremental phase corrections with one correction per symbol. Lock time is a function of the loop divide number, as the larger the number, the narrower the bandwidth and the longer the lock time.

In the preferred embodiment, it is desirable to shorten the preamble of the transmitted signal to a small number of symbols so as to minimize the overhead associated with this timing recovery and synchronization function, and also to minimize the detection delay. In the preferred embodiment, a dual-bandwidth loop is utilized where a wide bandwidth mode is used for acquisition during preamble transmission, and the narrow bandwidth mode is used in the steady-state during data transmission. Detection of the transition portion of the transmitted signal (a SYNC word) is used to switch the DSP timing loop from wide to narrow bandwidth modes.

Figure 6:
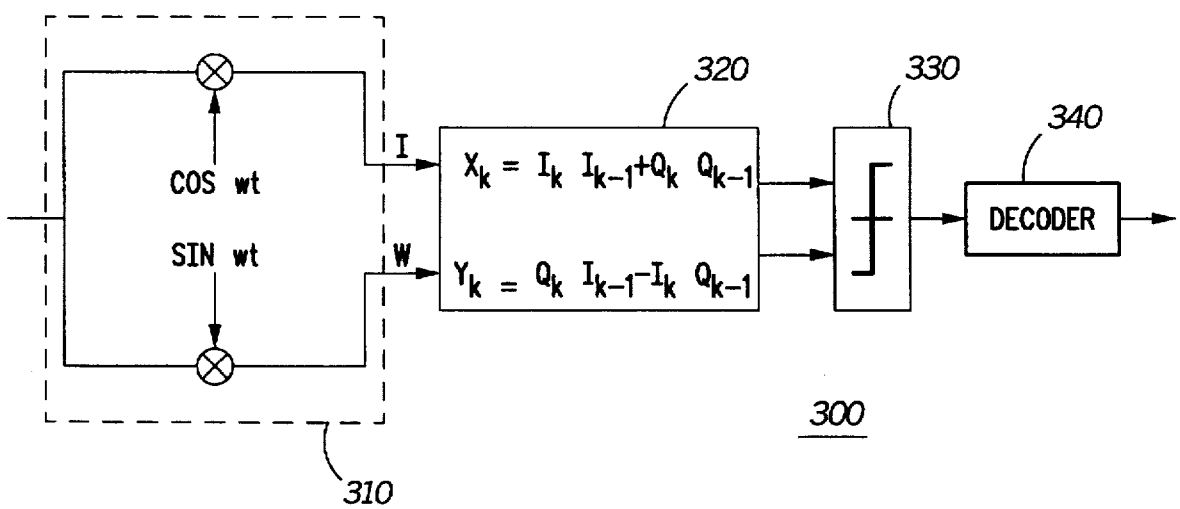
FIG. 6 is a block diagram illustrating a differential phase detector in accordance with the present invention.

FIG. 6 is a block diagram illustrating a differential phase detector 300 in accordance with the present invention. Due to the high symbol rate of the receiver and limited speed of the DSP, a highly efficient π/4-DQPSK differential detector is preferred. The traditional ARCTAN detector may not be used due to the processing requirements of the ARCTAN approximation. In FIG. 6, the local oscillator is assumed to have the same frequency as the modulated carrier. It is not phase coherent, however, and any phase error is canceled by differential detection, block 310. After the detection operation, as illustrated in block 320, a result may be formed in which $$X_k = I_k I_{k-1} + Q_k Q_{k-1}$$

$$Y_k = Q_k I_{k-1} + I_k Q_{k-1}$$

in which $I_k$ is the current sample of the in-phase component, $I_{k-1}$ is the previous sample of the in-phase component, $Q_k$ is the current sample of the quadrature component, and $Q_{k-1}$ is the previous sample of the quadrature component. $X_K$ and $Y_k$ are then hard limited in block 330. The decoder block 340 then decides (decodes) the dibits ($S_I$, $S_Q$):

$S_I=1$, if $X_k>0$; $S_I=0$, if $X_k<0$ $S_Q=1$, if $Y_k>0$; $S_Q=0$, if $Y_k<0$ where $S_I$ and $S_Q$ represents the dibits of the associated phase shift. Also in decoder block 340, the dibits are remapped such that a '11' dibit becomes '00' and a '00' dibit becomes '11' which will then be representative of the encoded differential phase shift as follows: ($S_I$, $S_Q$)=(0,0)=+π/4 phase shift; ($S_I$, $S_Q$)=(0,1)=+3π/4 phase shift; ($S_I$, $S_Q$)=(1,1)=−3π/4 phase shift; and ($S_I$, $S_Q$)=(1,0)=−π/4 phase shift. The decoding decisions are made at each symbol strobe point (center "eye" position) or at the location described in the flow diagram above. This differential detection method and decoding is very efficient, requiring only a four multiplies and two adds per symbol.

As mentioned above, the apparatus and methods in accordance with the present invention provide significant advancements in timing synchronization and data recovery for asynchronous data transmission. First, fast timing aquisition, available through the dual bandwidth capacity, allows for a significantly shorter preamble, reducing the timing information overhead in the transmitted signal and thereby increasing data throughput. Secondly, the dual bandwidth capability allows for a narrower sampling bandwidth during data decoding, having greater noise immunity, also increasing data throughput. Lastly, the present invention allows for an implementation utilizing a much less complicated and less expensive digital signal processor than prior art technologies.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. The invention is further defined by the following claims.

We claim:

1. An apparatus for synchronizing to and recovering data from a signal, the signal transmitted asynchronously over a communications channel to form a transmitted signal, the apparatus comprising:

an RF downconverter coupleable to the communications channel to receive the transmitted signal to form a received signal;

an analog-digital converter coupled to the RF downconverter to sample the received signal during an interrupt signal to form a digital representation of the received signal; and a digital signal processor coupled to the analog-digital converter, the digital signal processor having a set of program instructions and having a clock generator producing a clock signal, the digital signal processor producing the interrupt signal to the analog-digital converter, the digital signal processor responsive through the set of program instructions to determine an error parameter proportional to a timing variance between the received signal and the clock signal, and the digital signal processor further responsive to modify the timing of the interrupt signal based on the error parameter to synchronize the clock signal to the received signal for data recovery.

2. The apparatus of claim 1, wherein the digital signal processor further comprises a differential phase detector.

3. The apparatus of claim 1, wherein the digital signal processor further comprises:

a counter continuously producing a sequence of values, the sequence of values having an instantaneous value at any time; and a programmable capture register storing a programmable value.

4. The apparatus of claim 3 wherein the digital signal processor is further responsive to produce the interrupt signal when the instantaneous value equals the programmable value.

5. The apparatus of claim 1 wherein the digital signal processor further comprises a phase detector, the phase detector responsive to determine a relative phase difference between the received signal and the clock signal.

6. The apparatus of claim 5 wherein the error parameter is proportional to the relative phase difference.

7. The apparatus of claim 5 wherein the error parameter $E_n$, for each symbol interval, is determined from:

$$E_n = Y_I(r-\tfrac{1}{2})[Y_I(r) - Y_I(r-1)] + Y_Q(r-\tfrac{1}{2})[Y_Q(r) - Y_Q(r-1)]$$

in which $Y_I(r)$ is a current sample value from the analog-digital converter for an in-phase component, $Y_Q(r)$ is a current sample value from the analog-digital converter for a quadrature component, $Y_I(r-\tfrac{1}{2})$ is a previous sample value one sample interval (half symbol) earlier from the analog-digital converter for the in-phase component, $Y_Q(r-\tfrac{1}{2})$ is a previous sample value one sample interval (half symbol) earlier from the analog-digital converter for the quadrature component, $Y_I(r-1)$ is a previous sample value two sample intervals (full symbol) earlier from the analog-digital converter for the in-phase component, and $Y_Q(r-1)$ is a previous sample value two sample intervals (full symbol) earlier from the analog-digital converter for the quadrature component.

8. The apparatus of claim 1, wherein the digital signal processor is further responsive to limit a magnitude of the error parameter proportionally to a sampling bandwidth of the analog-digital converter.

9. The apparatus of claim 8, wherein the transmitted signal has a preamble containing timing information, a transition following the preamble and the transmitted signal further has data following the transition, and wherein the sampling bandwidth has a first value during reception of the preamble of the transmitted signal.

10. The apparatus of claim 9, wherein the sampling bandwidth has a second value during reception of data of the transmitted signal.

11. The apparatus of claim 10 wherein the second value has a smaller magnitude than the first value.

12. The apparatus of claim 10 wherein the sampling bandwidth changes from the first value to the second value upon reception of the transition of the transmitted signal.

13. The apparatus of claim 1, wherein the digital signal processor further comprises a hard limiter which generates a hard limited signal from the received signal.

14. The apparatus of claim 13, wherein the digital signal processor further comprises a zero crossing detector which generates a zero crossing pulse in response to a zero crossing phase transition of the hard limited signal.

15. The apparatus of claim 14, wherein the error parameter is proportional to a timing difference between a rising edge of the clock signal and the zero crossing pulse.

16. The apparatus of claim 14, wherein the transmitted signal further has a symbol rate, the symbol rate having a plurality of harmonics including a first subharmonic, and wherein a sampling rate of the analog-digital converter is the first subharmonic of the symbol rate.

17. A method for synchronizing to and recovering data from a signal, the signal transmitted synchronously over a communications channel to form a transmitted signal, the method comprising:

(a) receiving the transmitted signal from the communications channel to form a received signal;

(b) sampling the received signal, in response to an interrupt signal, to form a sampled signal;

(c) converting the sampled signal to a digital representation of the sampled signal;

(d) determining an error parameter, the error parameter proportional to a timing variance between the received signal and a generated clock signal;

(e) modifying the timing of the interrupt signal to synchronize the generated clock signal to the received signal for data recovery.

18. The method of claim 17, further comprising:

(f) differentially detecting a phase difference for data recovery.

19. The method of claim 17, wherein step (e) further comprises:

(e1) continuously producing a sequence of values, the sequence of values having an instantaneous value at any time;

(e2) generating a programmable value stored in a register; and (e3) producing the interrupt signal when the instantaneous value equals the programmable value.

20. The method of claim 17, wherein step (d) further comprises:

(d1) determining a relative phase difference between the received signal and the clock signal; and (d2) forming the error parameter proportionally to the relative phase difference.

21. The method of claim 17 wherein step (d), determining the error parameter $E_n$, for each symbol interval, is determined from:

$$E_n = Y_I(r-\tfrac{1}{2})[Y_I(r)-Y_I(r-1)] + Y_Q(r-\tfrac{1}{2})[Y_Q(r)-Y_Q(r-1)]$$

in which $Y_I(r)$ is a current digital sample value for an in-phase component, $Y_Q(r)$ is a current digital sample value for a quadrature component, $Y_I(r-\tfrac{1}{2})$ is a previous digital sample value one sample interval (half symbol) earlier for the in-phase component, $Y_Q(r-\tfrac{1}{2})$ is a previous digital sample value one sample interval (half symbol) earlier for the quadrature component, $Y_I(r-1)$ is a previous digital sample value two sample intervals (full symbol) earlier for the in-phase component, and $Y_Q(r-1)$ is a previous digital sample value two sample intervals (full symbol) earlier for the quadrature component.

22. The method of claim 17, further comprising:

(g) limiting a magnitude of the error parameter proportionally to a sampling bandwidth.

23. The method of claim 22, wherein the transmitted signal has a preamble containing timing information, a transition following the preamble and the transmitted signal further has data following the transition, and wherein the sampling bandwidth has a first value during reception of the preamble of the transmitted signal in step (a).

24. The method of claim 23, wherein the sampling bandwidth has a second value during reception of data of the transmitted signal in step (a).

25. The method of claim 24 wherein the second value has a smaller magnitude than the first value.

26. The method of claim 24, further comprising changing the sampling bandwidth from the first value to the second value upon reception of the transition of the transmitted signal.

27. The method of claim 17, further comprising:

(h) hard limiting the received signal to form a hard limited signal;

(i) generating a zero crossing pulse in response to a zero crossing phase transition of the hard limited signal; and j) producing the error parameter, the error parameter proportional to a timing difference between a rising edge of the clock signal and the zero crossing pulse.

28. The method of claim 27, wherein the transmitted signal further has a symbol rate, the symbol rate having a plurality of harmonics including a first subharmonic, and wherein a sampling rate of the sampling step (b) is the first subharmonic of the symbol rate.

29. An apparatus for synchronizing to and recovering data from a signal, the signal transmitted over a communications channel to form a transmitted signal, the transmitted signal having a preamble containing timing information, a transition following the preamble and the transmitted signal further having data following the transition, the apparatus coupleable to the communications channel for the reception of the asynchronous transmitted signal, the apparatus comprising:

an RF downconverter to receive the transmitted signal to form a received signal and to convert the received signal to a baseband frequency;

an analog-digital converter coupled to the RF downconverter to sample the received signal during an interrupt signal to form a digital representation of the received signal; and a digital signal processor coupled to the analog-digital converter, the digital signal processor having a set of program instructions and having a clock generator producing a clock signal, the digital signal processor producing the interrupt signal to the analog-digital converter, the digital signal processor responsive through the set of program instructions to determine an error parameter proportional to a timing variance between the received signal and the clock signal and to modify the timing of the interrupt based on the error parameter to synchronize the clock signal to the received signal, the digital signal processor further comprising a counter continuously producing a sequence of values, the sequence of values having an instantaneous value at any time, a programmable capture register storing a programmable value, and the digital signal processor further responsive to produce the interrupt signal when the instantaneous value equals the programmable value to synchronize the clock signal to the received signal for data recovery.

30. The apparatus of claim 29 wherein the digital signal processor further comprises a differential phase detector responsive to determine a relative phase difference between the received signal and the clock signal, and wherein the digital signal processor is further responsive to generate the error parameter proportionally to the relative phase difference.

31. The apparatus of claim 29 wherein the digital signal processor is further responsive to limit the magnitude of the error parameter proportionally to a sampling bandwidth of the analog-digital converter, the sampling bandwidth having a first value during reception of the preamble of the transmitted signal and the sampling bandwidth having a second value during reception of the transition of the transmitted signal, and wherein the sampling bandwidth changes from the first value to the second value upon reception of the transition portion of the transmitted signal.

32. The apparatus of claim 29, wherein the digital signal processor further comprises:

a hard limiter which generates a hard limited signal from the received signal;

a zero crossing detector which generates a zero crossing pulse in response to a zero crossing phase transition of the hard limited signal; and wherein the digital signal processor is further responsive to generate the error parameter in proportional to a timing difference between a rising edge of the clock signal and the zero crossing pulse.

* * * * *